(12) United States Patent
Park

(10) Patent No.: US 9,253,394 B2
(45) Date of Patent: Feb. 2, 2016

(54) DIGITAL PHOTOGRAPHING APPARATUS FOR SETTING FOCUS AREA VIA TOUCH INPUTS AND CONTROL METHOD OF THE SAME

(71) Applicant: Samsung Electronics Co., Ltd, Suwon-si, Gyeonggi-do (KR)

(72) Inventor: Il-Kwon Park, Anyang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 66 days.

(21) Appl. No.: 13/920,298

(22) Filed: Jun. 18, 2013

(65) Prior Publication Data

US 2013/0342747 A1  Dec. 26, 2013

(30) Foreign Application Priority Data

Jun. 21, 2012  (KR) .................. 10-2012-0066901

(51) Int. Cl.
*H04N 5/232* (2006.01)

(52) U.S. Cl.
CPC ....... *H04N 5/23216* (2013.01); *H04N 5/23212* (2013.01)

(58) Field of Classification Search
CPC ............ H04N 5/2321; H04N 5/23212; H04N 5/23216
USPC ..................................... 348/345, 349, 333.11
See application file for complete search history.

(56) References Cited

U.S. PATENT DOCUMENTS

| | | | |
|---|---|---|---|
| 2008/0263445 A1* | 10/2008 | Park ............................ | 715/702 |
| 2010/0017710 A1 | 1/2010 | Kim et al. | |
| 2010/0020030 A1* | 1/2010 | Kim et al. ..................... | 345/173 |
| 2011/0050608 A1 | 3/2011 | Homma et al. | |
| 2011/0187655 A1* | 8/2011 | Min et al. ...................... | 345/173 |
| 2011/0248942 A1* | 10/2011 | Yana et al. .................... | 345/173 |
| 2011/0267530 A1* | 11/2011 | Chun ....................... | 348/333.11 |
| 2012/0120277 A1* | 5/2012 | Tsai ........................... | 348/223.1 |
| 2013/0070145 A1* | 3/2013 | Matsuyama ............ | 348/333.12 |
| 2013/0257806 A1* | 10/2013 | Abe et al. ...................... | 345/174 |
| 2013/0293683 A1* | 11/2013 | Zhou et al. ..................... | 348/47 |
| 2014/0290465 A1* | 10/2014 | Salazar et al. ................. | 84/602 |

FOREIGN PATENT DOCUMENTS

| | | |
|---|---|---|
| JP | 2007-236008 | 9/2007 |
| JP | 2011-053972 | 3/2011 |
| KR | 2010-0009986 | 1/2010 |
| KR | 2012-0023339 | 3/2012 |

* cited by examiner

*Primary Examiner* — Nhan T Tran
*Assistant Examiner* — Chan Nguyen
(74) *Attorney, Agent, or Firm* — Staas & Halsey LLP

(57) ABSTRACT

A control method of a digital photographing apparatus includes displaying an image that is being input through a photographing unit on a touch screen, recognizing touch inputs with respect to two points on the touch screen, detecting a focusing area by using coordinate values of the two touched points, and performing auto focusing based on the focusing area, and when a photographing command is input, capturing an image on which the auto focusing is performed. Therefore, a user may view an image while performing autofocusing commands without covering a focusing area that the user wants to photograph.

24 Claims, 7 Drawing Sheets

DIGITAL PHOTOGRAPHING APPARATUS FOR SETTING FOCUS AREA VIA TOUCH INPUTS AND CONTROL METHOD OF THE SAME

CROSS-REFERENCE TO RELATED APPLICATIONS

This application claims priority under 35 U.S.C. §119(a) from Korean Patent Application No. 2012-0066901 filed Jun. 21, 2012 in the Korean Intellectual Property Office, the disclosure of which is incorporated herein by reference in its entirety.

BACKGROUND

1. Field

The present general inventive concept relates to a digital photographing apparatus and a control method of the same. More particularly, the present general inventive concept relates to a digital photographing apparatus that performs auto-focusing through at least one touch input on a touch screen, and a control method of the same.

2. Description of the Related Art

A conventional digital photographing apparatus, such as a camera, a camcorder, etc., uses physical input members, such as key pads, or shutter buttons, to adjust its settings or to perform a photographing operation. Particularly, when photographing an image, a user performs auto-focusing by pressing a shutter halfway (i.e., a half-shutter input), and then photographing an image to which the auto-focusing is applied by pressing the shutter all the way down (i.e., a full-shutter input).

However, when a shutter is used to capture an image, a camera may wobble while the shutter is being pressed, so the user photographs shaky images.

In order to overcome the above-described problems while maintaining lighter and slimmer digital photographing apparatuses having larger display screens, a touch screen has been used as an input member of the digital photographing apparatus instead of the key pad or shutter button. In other words, the user can adjust the settings of the digital photographing apparatus or perform an image photographing operation through at least one touch input on the touch screen.

Particularly, when the touch input on the touch screen is used to take an image, the user touches a desired focusing area to perform auto-focusing and captures an auto-focused image by a photographing command.

However, when the focusing area is touched by the user to perform the auto-focusing and image capture, the focusing area is covered by the user's hand touching the touch screen, thereby preventing the user from being able to view the entire focusing area.

SUMMARY

The present general inventive concept provides a digital photographing apparatus that can use two coordinate values of two points touched by a user to detect a focusing area in order to perform auto-focusing without covering the focusing area by using a touch screen, and a control method of the same.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a control method of a digital photographing apparatus, which may include displaying an image that is being input through a photographing unit on a touch screen, recognizing touch inputs with respect to two points on the touch screen, using coordinate values of the two touched points to detect a focusing area, and performing auto focusing based on the focusing area, and when a photographing command is input, capturing an image on which the auto focusing is performed.

The performing of the auto focusing may include detecting a center point between the two touched points as the focusing area to perform the auto focusing.

The control method may include detecting pressure values of the two touched points; wherein the performing of the auto focusing comprises using coordinate values and pressure values of the two touched points to detect the focusing area.

The coordinate value of the focusing area may be calculated by a formula, $$(X_f, Y_f) = \left( \frac{P_1 X_1 + P_2 X_2}{P_1 + P_2}, \frac{P_1 Y_1 + P_2 Y_2}{P_1 + P_2} \right)$$

where $(X_f, Y_f)$ is a coordinate value of a focus, $X_1$ and $Y_1$ are X and Y coordinate values of a first touch point, $X_2$ and $Y_2$ are X and Y coordinate values of a second touch point, $P_1$ is a pressure value of the first touch point, and $P_2$ is a pressure value of the second touch point.

The photographing command may include a touch input that has a pressure value equal to or greater than a predetermined pressure value with respect to the two touched points.

The control method may include, when a distance between the two touched points is increased, performing a zoom-in operation, and when the distance between the two touched points is decreased, performing a zoom-out operation.

The foregoing and/or other features and utilities of the present general inventive concept may also be achieved by providing a digital photographing apparatus including a photographing unit, a touch screen o display an image being input through the photographing unit, and a control unit which when touch inputs with respect to two points on the touch screen are recognized, uses coordinate values of the two touched points to detect a focusing area, perform auto focusing based on the focusing area, and when a photographing command is input, control the photographing unit to capture an image on which the auto focusing is performed.

The control unit may detect a center point between the two touched points as the focusing area and performs the auto focusing.

The control unit may detect pressure values of the two touched points, and may use the coordinate values and pressure values of the two touched points to detect the focusing area.

A coordinate value of the focusing area may be calculated by a formula, $$(X_f, Y_f) = \left( \frac{P_1 X_1 + P_2 X_2}{P_1 + P_2}, \frac{P_1 Y_1 + P_2 Y_2}{P_1 + P_2} \right)$$

where $(X_f, Y_f)$ is a coordinate value of a focus, $X_1$ and $Y_1$ are X and Y coordinate values of a first touch point, $X_2$ and $Y_2$ are X and Y coordinate values of a second touch point, $P_1$ is a pressure value of the first touch point, and $P_2$ is a pressure value of the second touch point.

The photographing command may include a touch input that has a pressure value equal to or greater than a predetermined pressure value with respect to the two touched points.

When a distance between the two touched points is increased, the control unit may perform a zoom-in operation, and when the distance between the two touched points is decreased, the control unit may perform a zoom-out operation.

The foregoing and/or other features and utilities of the present general inventive concept may also be achieved by providing a control method of a digital photographing apparatus, including displaying an image being input through a photographing unit on a touch screen, recognizing a touch input with respect to one point on the touch screen, using a coordinate value of the touched point and a coordinate value of a predetermined point on the touch screen to detect a focusing area, and performing auto focusing based on the focusing area, and when a photographing command is input, capturing an image on which the auto focusing is performed.

The performing of the auto focusing may include detecting a center point between the touched point and the predetermined point as the focusing area to perform the auto focusing.

The performing of the auto focusing may include, when a pressure value of the touched point is increased, moving the focusing area toward the touched point.

The foregoing and/or other features and utilities of the present general inventive concept may also be achieved by providing a digital photographing apparatus, including a photographing unit, a touch screen to display an image being input through the photographing unit, and a control unit which when a touch input with respect to one point on the touch screen is recognized, uses a coordinate value of the touched point and a coordinate value of a predetermined point on the touch screen to detect a focusing area, performs auto focusing based on the focusing area, and when a photographing command is input, controls the photographing unit to capture an image on which the auto focusing is performed.

The control unit may detect a center point between the touched point and the predetermined point as the focusing area and performs the auto focusing.

When a pressure value of the touched point is increased, the control unit may move the focusing area toward the touched point.

The foregoing and/or other features and utilities of the present general inventive concept may also be achieved by providing a digital photographing apparatus, including a touch screen to display an image and to sense at least one touch of a user, a photographing unit to capture the image, and a control unit to detect a focusing area based on the sensed at least one touch of a user and to perform an auto focusing operation at a location corresponding to the focusing area in response to an input photographing command to capture the image.

The control unit may calculate a location of the focusing area by comparing at least one of a pressure and a location of the sensed at least one touch of the user to another touch of the user.

The control unit may calculate a location of the focusing area by comparing at least one of a pressure and a location of the sensed at least one touch of the user to a predetermined location on the touch screen.

The predetermined location on the touch screen may be user-defined.

The touch screen may display a focusing frame at the location corresponding to the focusing area.

The focusing area may move closer to a location of the touch of the user as a pressure of the touch increases.

A movement of the touch of the user on the touch screen may cause the image to zoom in and/or out.

The image displayed on the touch screen may be a live view image input through the photographing unit.

The digital photographing apparatus may further include a storage unit to store a plurality of images therein, wherein the image displayed on the touch screen is one of the plurality of images stored within the storage unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
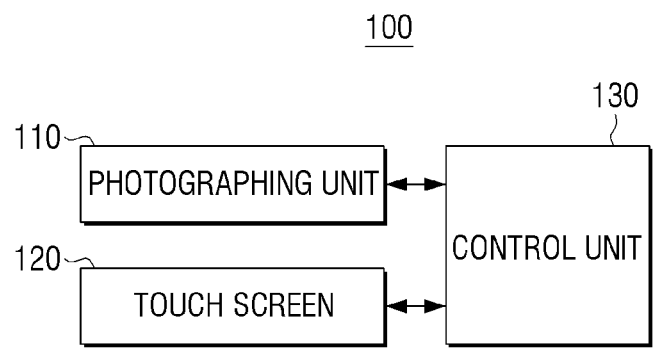
FIG. 1 is a block diagram illustrating a configuration of a digital photographing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

FIG. 1 is a block diagram illustrating a configuration of a digital photographing apparatus 100 according to an exemplary embodiment of the present general inventive concept. As illustrated in FIG. 1, the digital photographing apparatus 100 includes a photographing unit 110, a touch screen 120, and a control unit 130. The digital photographing apparatus 100 may include a digital camera, a smart phone, a camcorder, etc., but is not limited thereto.

The photographing unit 110 converts a light that is input from a lens (not illustrated) into an electrical signal to photograph an image. Then the photographing unit 110 outputs a photographed image on the touch screen 120 or to a storage unit (not illustrated).

The touch screen 120 may display an image photographed by the photographing unit 110 and may also receive touch commands of a user. Particularly, the touch screen 120 receives the user's touch input to detect a touch area to perform auto-focusing. In detail, the touch screen 120 can detect not only X coordinate values and Y coordinate values of points touched by the user, but may also detect pressure values P of the touched points.

In response to the touch screen 120 receiving two touch inputs of the user, the control unit 130 uses coordinate values of the two touched points to detect the focusing area and performs the auto focusing based on the focusing area.

Specifically, the control unit 130 detects the coordinate values of the two touched points on the touch screen 120. Then, the control unit 130 determines a center point between the detected coordinate values of the two touched points as the focusing area, and can perform the auto focusing based on the detected focusing area.

Also, a difference in touch pressure of the two touched points may be equal to or greater than a predetermined pressure value, or a pressure value of at least one of the two touched points may be increased, thereby resulting in the control unit 130 detecting the pressure values as well as the coordinate values of the two touched points. Accordingly, the control unit 130 can detect the focusing area by using the coordinate values and pressure value of the two touched points. Particularly, the control unit 130 may detect the focusing area closer to one touched point having a pressure value larger than that of the other touched point of the two touched points. As such, the control unit 130 can perform the auto focusing based on the detected focusing area.

According to another exemplary embodiment of the present general inventive concept, in response to recognizing a touch input with respect to one point on the touch screen 120, the control unit 130 may use a coordinate value of the touched point on the touch screen 120 and a coordinate value of a predetermined point to detect the focusing area, and thereby may perform the auto focusing based on the focusing area.

Then, in response to a photographing command being input, the control unit 130 controls the photographing unit 110 to photograph the image on which the auto focusing is performed.

As described above, a digital photographing apparatus according to an exemplary embodiment of the present general inventive concept utilizes coordinate values of two points to detect a focusing area, and therefore a user may view an image while performing auto-focusing commands without covering a focusing area that the user wants to photograph.

Figure 2:
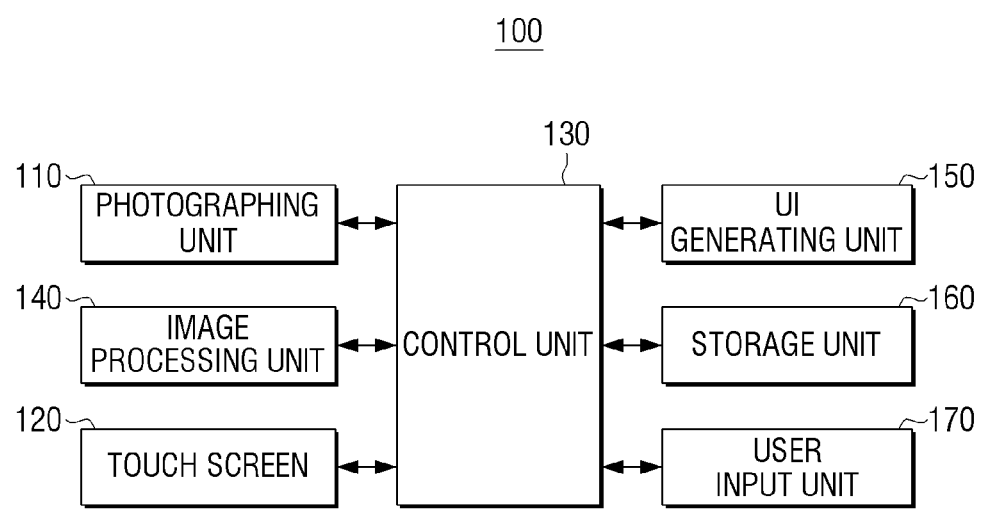
FIG. 2 is a detailed block diagram illustrating a configuration of a digital photographing apparatus according to an exemplary embodiment of the present general inventive concept.

FIG. 2 is a detailed block diagram illustrating a configuration of a digital photographing apparatus 100 according to an exemplary embodiment of the present general inventive concept. As illustrated in FIG. 2, the digital photographing apparatus 100 includes a photographing unit 110, an image processing unit 140, a touch screen 120, a user interface (UI) generating unit 150, a storage unit 160, a user input unit 170 and a control unit 130.

The photographing unit 110 converts a light that enters from a lens (not illustrated) into an electric signal to photograph an image. Specifically, the photographing unit 110 may include a shutter, a lens unit, an iris, a charge coupled device (CCD) image sensor, and an analog/digital converter (ADC), etc. (not illustrated), but is not limited thereto. The shutter is a component to adjust the amount of exposure light with the iris. The lens unit receives light from an external light source and forms an image. At this time, the iris adjusts the amount of entering light depending on a degree of opening and closing thereof. The CCD image sensor accumulates the amount of light that entered through the lens unit, and outputs an image captured by the lens unit based on the accumulated amount of light in accordance with a vertical sync signal. An image acquisition of the digital photographing apparatus 100 is achieved by the CCD image sensor, which converts light that is reflected from an object into electric signals. A color filter is needed to obtain a color image by using the CCD image sensor. A color filter called a "color filter array" (CFA) is typically used. The CFA has a plurality of pixels each of which allows only light representing one color to pass therethrough, and is formed in a regularly arranged structure. The CFA has various shapes depending on an array structure thereof. The ADC converts an analog image signal which is output from the CCD image sensor into a digital signal.

However, the photographing unit 110 may utilize any other method of photographing an image in addition to the method described above. For example, instead of the CCD image sensor, a complementary metal oxide semiconductor (CMOS) image sensor may be used to photograph an image.

The image processing unit 140 signal-processes digital-converted RAW data to be able to be displayed by the control unit 130. The image processing unit 140 removes a black level due to a dark current which occurs in the CCD image sensor and the CFA filter sensitive to changes in temperature. The image processing unit 140 performs gamma correction to encode information in accordance with the nonlinearity of the human visual system. The image processing unit 140 performs CFA interpolation to interpolate a Bayer pattern of a predetermined gamma correction data implemented in RGRG lines and GBGB lines into RGB lines. The image processing unit 140 converts the interpolated RGB signals into YUV signals, performs edge compensation to sharpen an image by filtering Y signals by a high-pass filter and color correction to correct color values of U and V signals by using a standard color coordinate system, and removes noise thereof. The image processing unit 140 performs compression and signal processing on the noise-removed Y, U, and V signals so as to generate a JPEG file, and the generated JPEG file is displayed on the touch screen 120 and stored on the storage unit 160.

The image processing method performed by the image processing unit 140, as described above, is only one example, and is not limited thereto. As such, the image processing unit 140 can process the image by using alternative methods.

The touch screen 120 displays image data which are processed in the image processing unit 140 or image data that is stored on the storage unit 160. Particularly, the touch screen 120 can detect not only an X coordinate value and a Y coordinate value of a point which a user touches but also a pressure value of the touched point.

Figure 3:
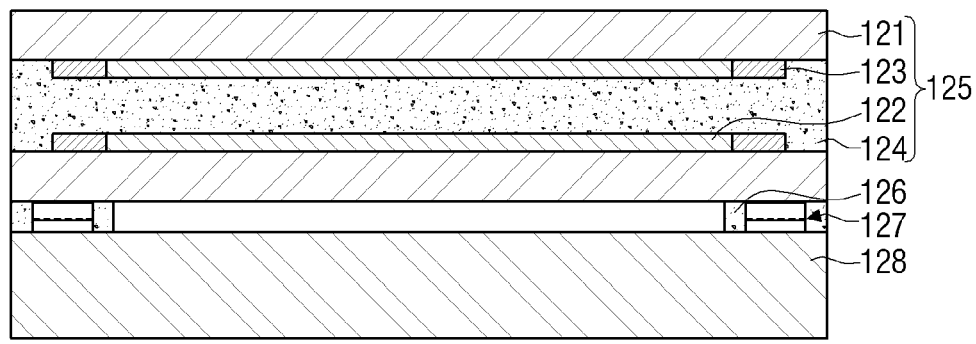
FIG. 3 is a view illustrating a touch screen according to an exemplary embodiment of the present general inventive concept.

FIG. 3 is a view illustrating a touch screen according to an exemplary embodiment of the present general inventive concept The touch screen 120 according to FIG. 3 includes a touch panel 125, a display panel 128, and a plurality of pressure sensitive sensors 127. The pressure sensitive sensor 127 includes a piezoresistor (not illustrated), a resistive value of which changes in response to a change in touch pressure.

The touch panel 125 is an element that detects a two-dimension coordinate value, that is, an X coordinate value and a Y coordinate value of a point where a contact input occurs, and may be a capacitive touch panel 125 having two sheets of transparent substrates 121 as illustrated in FIG. 3. However, this is only one example, and various types of touch panels may be applied.

The touch panel 125 may include two sheets of transparent substrates 121, two transparent electrodes 122, electrode wirings 123, and a spacer 124. The transparent substrate 121 protects the touch panel 125 and at the same time provides a space where the transparent electrode 122 is formed. The transparent electrode 122 is formed on a surface of the transparent substrate 121 and recognizes a signal from a contact input of a certain object. The electrode wirings 123 are formed on the transparent electrode 122 to apply voltage to the transparent electrode 122. The spacer 124 bonds the two sheets of transparent substrates 121 and insulates the transparent electrodes 122 formed on the transparent substrates 121 from each other.

The display panel 128 is an element that displays an image to a user, and is bonded on a surface of the touch panel 125 by an adhesive layer 126. At this time, the display panel 128 may be implemented as a liquid crystal display (LCD), a plasma display panel (PDP), an electroluminescence (EL) or a cathode ray tube (CRT), etc., but is not limited thereto.

The plurality of pressure sensitive sensors 127 may each be spaced apart from each other between the touch panel 125 and the display panel 128, and detect a pressure of a touch input.

The touch screen 120, as illustrated in FIG. 3, is only one example, and various types of touch screens may be used to detect not only X and Y coordinate values, but also a pressure value of a touched point.

Referring to FIG. 2, the UI generating unit 150 generates user interfaces (UIs) by control of the control unit 130. Particularly, the UI generating unit 150 can generate various UIs to manipulate a setting of the digital photographing apparatus 100.

The storage unit 160 stores programs and data to drive the digital photographing apparatus 100 and image data processed in the image processing unit 140.

The user input unit 170 receives commands of the user. The user input unit 170 may be implemented by buttons provided on an external surface of the digital photographing apparatus 100. For example, the user input unit 170 may include a power control button, a mode change button, etc., but is not limited thereto.

The control unit 130 controls overall operations of the digital photographing apparatus 100 according to user commands input through the touch screen 120 or the user input unit 170. Specifically, when touch inputs with respect to two points of the touch screen 120 are recognized (i.e., sensed), the control unit 130 uses coordinate values of the two touched points to detect a focusing area, performs auto focusing based on the focusing area, and, when a photographing command is input, controls the photographing unit 110 to capture an image on which the auto focusing is performed.

Specifically, in a live view mode in which images being taken by the photographing unit 110 are displayed real-time, the control unit 130 determines whether touch inputs are recognized (i.e., sensed) on two points of the touch screen 120.

When the touch inputs are recognized on the two points of the touch screen 120, the control unit 130 detects coordinate values of the two touched points. In order words, the control unit 130 detects an X coordinate value and a Y coordinate value of each of first and second touch points. Then, the control unit 130 detects a center point between the first touch point and the second touch point as a focusing area.

Figure 4:
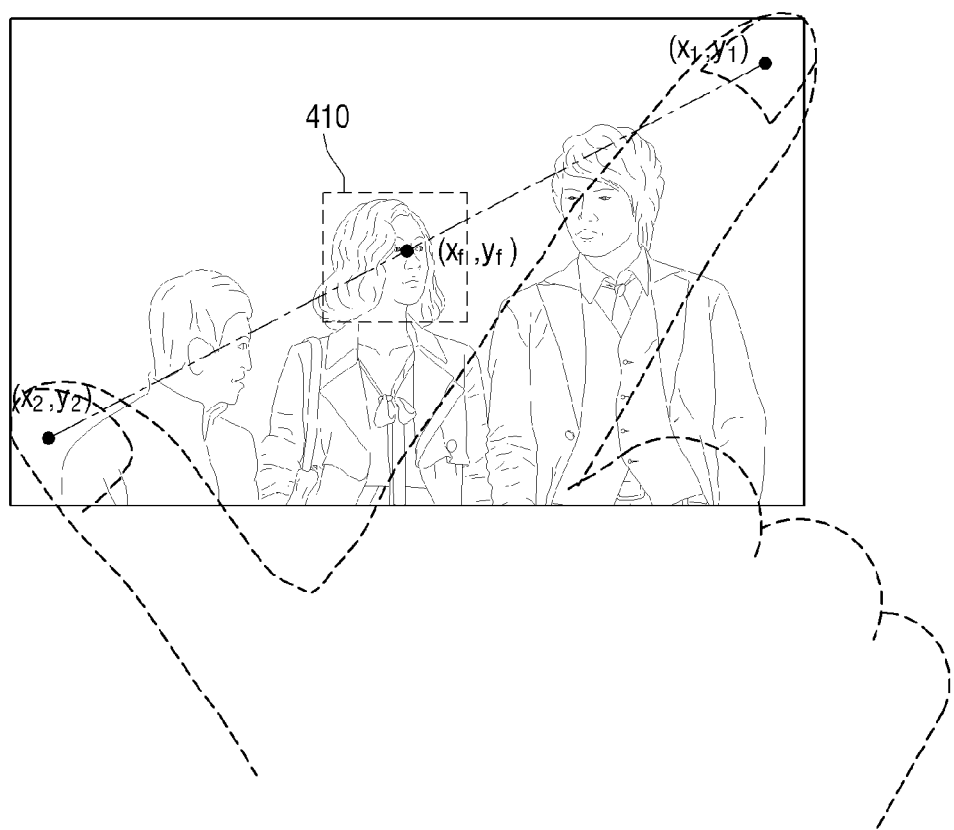
FIG. 4 is a view illustrating a method of detecting a focusing area by using coordinate values of two touched points according to an exemplary embodiment of the present general inventive concept.

FIG. 4 is a view illustrating a method of detecting a focusing area by using coordinate values of two touched points according to an exemplary embodiment of the present general inventive concept. As illustrated in FIG. 4, if the first touch point has a coordinate value $(X_1, Y_1)$ and the second touch point has a coordinate value $(X_2, Y_2)$, the control unit 130 determines a coordinate value $$\left(\frac{X_1 + X_2}{2}, \frac{Y_1 + Y_2}{2}\right)$$

of a center point between the first touch point and the second touch point as a coordinate value $(X_f, Y_f)$ of a center point of the focusing area.

Then, the control unit 130 detects an area within a predetermined range around the determined coordinate value $(X_f, Y_f)$ as the focusing area, generates a focusing frame 410 as illustrated in FIG. 4, and performs auto focusing based on the detected focusing area.

Also, the control unit 130 can detect the focusing area by using not only the coordinate values of the two touched points but also pressure values of the two points.

Figure 5:
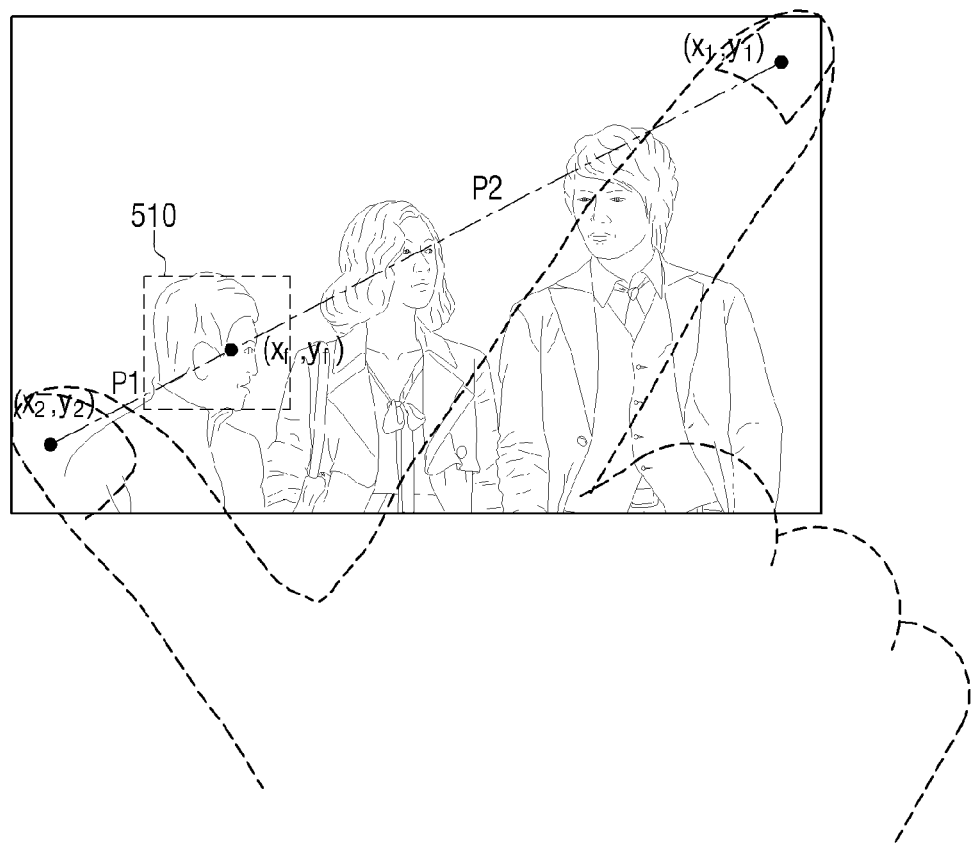
FIG. 5 is a view illustrating a method of detecting a focusing area by using coordinate values and pressure values of two touched points according to an exemplary embodiment of the present general inventive concept.

FIG. 5 is a view illustrating a method of detecting a focusing area by using coordinate values and pressure values of two touched points according to an exemplary embodiment of the present general inventive concept. As illustrated in FIG. 5, when a difference between pressure values of the two touched points is greater than a predetermined value or when a pressure value of anyone of the two touched points is increased after the center point between the two touched points is detected as the focusing area, the control unit 130 detects the pressure values of the two touched points.

Then, after the pressure values of the two touched points are detected, the control unit 130 may move the focusing area closer to one point having a larger pressure value than that of the other point. For example, when the pressure value of a first touch point P1 is greater than the pressure value of a second touch point P2, as illustrated in FIG. 5, the control unit 130 may move a focusing area (a.k.a., focusing frame) 510 closer to the first touch point P1. At this time, a coordinate value of a center point of the moved focusing area 510 may be calculated by Formula 1.

$$(X_f, Y_f) = \left(\frac{P_1 X_1 + P_2 X_2}{P_1 + P_2}, \frac{P_1 Y_1 + P_2 Y_2}{P_1 + P_2}\right) \quad \text{FORMULA 1}$$

In the above Formula 1, $(X_f, Y_f)$ is a coordinate value of a focus, $X_1$ and $Y_1$ are X and Y coordinate values of the first touch point, $X_2$ and $Y_2$ are X and Y coordinate values of the second touch point, $P_1$ is a pressure value of the first touch point, and $P_2$ is a pressure value of the second touch point.

When the center point of the focusing area 510 is moved, the control unit 130 can move and display the focusing area 510 with its center point.

After the focusing area 510 is detected and auto focusing is performed, when a photographing command is input, the control unit 130 takes an image on which the auto focusing is performed. At this time, the photographing command may be a command that a pressure value equal to or greater than a predetermined pressure value is detected on the two touched points P1 and P2. However, this is only one example, and the command may be implemented by other methods, for example, a button.

Furthermore, while the auto focusing is being performed by using the two touched points P1 and P2, when a distance between the two touched points P1 and P2 is changed, the control unit 130 can perform a zoom-in operation or a zoom-out operation. Specifically, while the auto focusing the two touched points P1 and P2 is being performed, when the distance between the two touched points P1 and P2 is increased, the control unit 130 can perform the zoom-in operation, and when the distance between the two touched points P1 and P2 is decreased, the control unit 130 can perform the zoom-out operation. Therefore, a user touches two points P1 and P2 on the touch screen 120 to allow not only the auto focusing but also the zoom-in and zoom-out operations to be performed.

Figure 6:
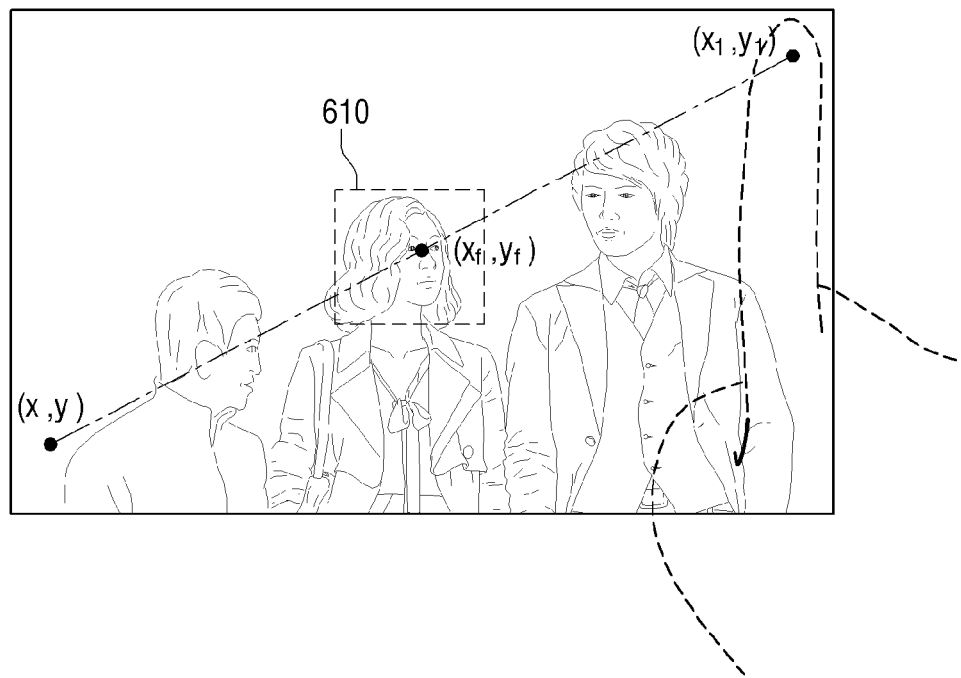
FIG. 6 is a view illustrating a method of detecting a focusing area by using a coordinate value of a touched point and a coordinate value of a predetermined point according to another exemplary embodiment of the present general inventive concept.

FIG. 6 is a view illustrating a method of detecting a focusing area by using a coordinate value of a touched point and a coordinate value of a predetermined point according to another exemplary embodiment of the present general inventive concept. According to FIG. 6, in a live view mode in which images being taken by the photographing unit 110 are displayed real-time, the control unit 130 determines whether a touch input is recognized on only one point of the touch screen 120.

Referring to FIG. 6, when the touch input is recognized (i.e., sensed) on one point of the touch screen 120, the control unit 130 calculates a coordinate value of the touched point. Then, the control unit 130 uses the coordinate value of the touched point and a coordinate value of a predetermined point on the touch screen 120 to detect a focusing area, and performs auto focusing based on the detected focusing area.

At this time, the predetermined point on the touch screen 120, as illustrated in FIG. 6, may be a point in a bottom left part of the touch screen 120. However, this is only one example, and the predetermined point may be located in a different area of the touch screen 120, and may be changed by a user setting.

Then, the control unit 130 detects a center point between the touched point and the predetermined point on the touch screen 120 as a focusing area. Specifically, as illustrated in FIG. 6, if the touched point has a coordinate value $(X_1, Y_1)$ and the predetermined point on the touch screen 120 has a coordinate value $(X, Y)$, the control unit 130 determines a coordinate value $$\left(\frac{X_1 + X}{2}, \frac{Y_1 + Y}{2}\right)$$

of a center point between the touched point and the predetermined point on the touch screen 120 as a coordinate value $(X_f, Y_f)$ of a center point of the focusing area.

Then, the control unit 130 detects an area within a predetermined range around the determined coordinate value $(X_f, Y_f)$ as the focusing area, generates a focusing frame 610 as illustrated in FIG. 6, and performs auto focusing based on the detected focusing area.

While the user's hand touches the touch screen 120, when a pressure value of the touched point is increased, the control unit 130 can move the focusing area closer to the touched point according to the pressure value of the touched point.

Then, after the focusing area is detected and auto focusing is performed, when a photographing command is input, the control unit 130 takes an image on which the auto focusing is performed. The photographing command may be a command that a pressure value equal to or greater than a predetermined pressure value is detected on the touched point. However, this is only one example, and the command may be implemented by different methods, for example, a button.

With the digital photographing apparatus 100 as described above, since coordinate values of two points are used to detect a focusing area, the user may view an image while performing auto-focusing commands without covering the focusing area that the user wants to photograph.

Figure 7:
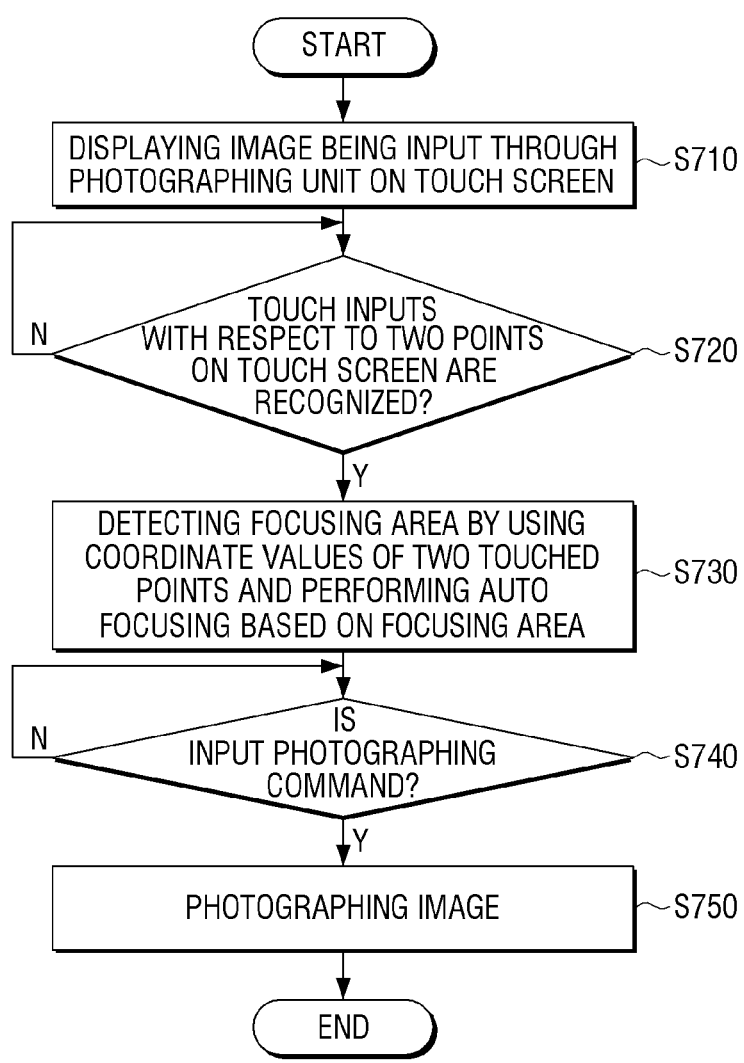
FIGS. 7 and 8 are flowcharts illustrating a control method of a digital photographing apparatus according to an exemplary embodiment of the present general inventive concept.

A control method of the digital photographing apparatus 100 according to an exemplary embodiment of the present general inventive concept will be described in detail with reference to FIGS. 7 and 8. FIG. 7 is a flowchart illustrating a method of detecting a focusing area by using two touched points according to an exemplary embodiment of the present general inventive concept.

First, the digital photographing apparatus 100 displays an image being input through the photographing unit 110 on the touch screen 120 (S710).

In the live view mode in which images input through the photographing unit 110 are displayed on the touch screen 120, the digital photographing apparatus 100 recognizes, i.e., senses, touch inputs with respect to two points of the touch screen 120 (S720).

If the touch inputs with respect to two points on the touch screen 120 are recognized (S720-Y), the digital photographing apparatus 100 uses coordinate values of the two touched points to detect a focusing area, and performs auto focusing based on the focusing area (S730). Specifically, the digital photographing apparatus 100 can detect a center point between the two touched points as the focusing area. Also, the digital photographing apparatus 100 can detect the focusing area by using pressure values of the two touched points as well as the coordinate values of the two touched points. For example, when a pressure value of anyone of the two touched points is increased, the digital photographing apparatus 100 can move the focusing area closer to the point the pressure value of that is increased between the two touched points.

After the auto focusing is performed, the digital photographing apparatus 100 determines whether a photographing command is input (S740). The photographing command may be a command having a pressure value equal to or greater than a predetermined pressure value on the two touched points, but is not limited thereto.

If the photographing command is input (5740-Y), the digital photographing apparatus 100 captures an image on which the auto focusing is performed (S750).

As described above, since two touched points touched are used to detect a focusing area, the user can perform auto focusing operation without covering the focusing area that the user wants to photograph.

Figure 8:
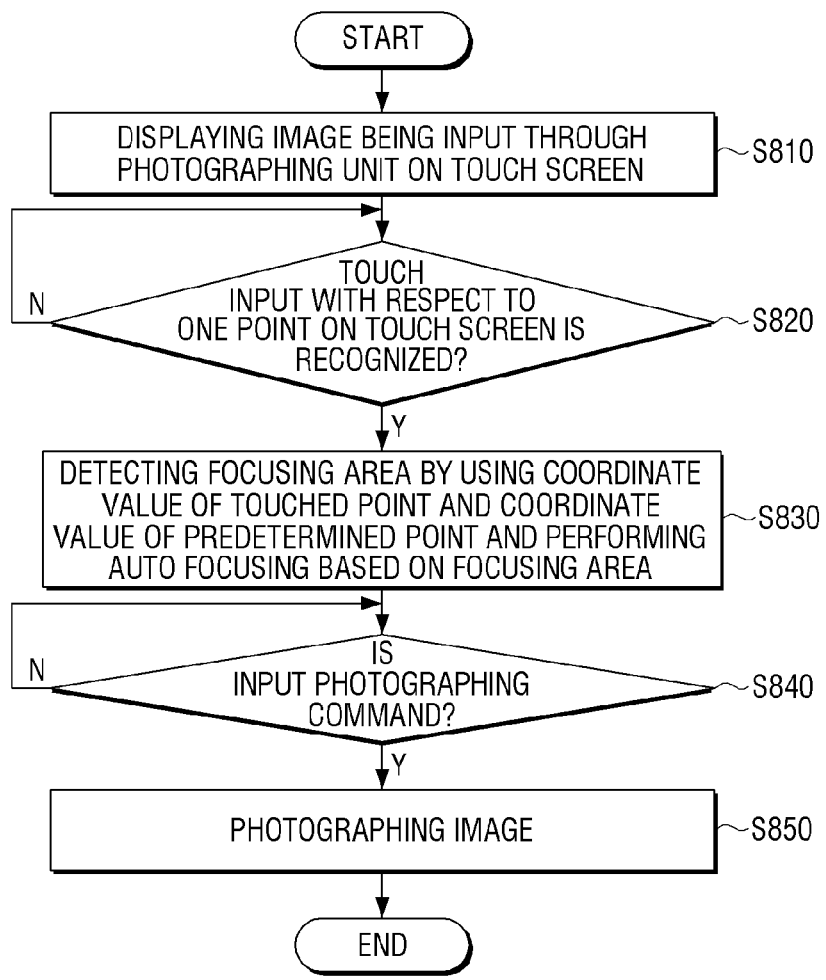

FIG. 8 is a flowchart illustrating a method of detecting a focusing area by using one touched point according to an exemplary embodiment of the present general inventive concept.

First, the digital photographing apparatus 100 displays an image being input through the photographing unit 110 on the touch screen 120 (S810).

In the live view mode in which images being input through the photographing unit 110 are displayed on the touch screen 120, the digital photographing apparatus 100 recognizes, i.e., senses, a touch input with respect to one point of the touch screen 120 (S820).

If the touch input with respect to the one point on the touch screen 120 is recognized (S820-Y), the digital photographing apparatus 100 uses a coordinate value of the touched point and a coordinate value of a predetermined point on the touch screen 120 to detect a focusing area, and performs auto focusing based on the focusing area (S830). Specifically, the digital photographing apparatus 100 can detect a center point between the touched point and the predetermined point on the touch screen 120 as the focusing area. Also, when a pressure value of the touched point is increased, the digital photographing apparatus 100 can move the focusing area closer to the touched point. In the other words, the digital photographing apparatus 100 can move the focusing area according to the pressure value of the point that a user touches. Then, after the focusing area is fixed, the digital photographing apparatus 100 performs auto focusing.

After the auto focusing is performed, the digital photographing apparatus 100 determines whether a photographing command is input (S840). The photographing command may be a command having a pressure value equal to or greater than a predetermined pressure value with respect to a touched point, but is not limited thereto.

If the photographing command is input (S840-Y), the digital photographing apparatus 100 captures an image on which the auto focusing is performed (S850).

As described above, since only a single touched point is used to detect a focusing area, the user can perform auto focusing operation by using only one hand without covering the focusing area that the user wants to photograph.

The present general inventive concept, as described above, can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A control method of a digital photographing apparatus, comprising:
   displaying an image that is being input through a photographing unit on a touch screen;
   recognizing touch inputs with respect to two touched points on the touch screen;
   automatically setting a focusing area which is located between the two touched points in response to the two touched points, and performing auto focusing based on the focusing area; and
   when a photographing command is input, capturing an image on which the auto focusing is performed.

2. The control method of claim 1, wherein the performing of the auto focusing comprises setting a center point between the two touched points as the focusing area to perform the auto focusing.

3. The control method of claim 1, further comprising:
   detecting pressure values of the two touched points;
   wherein the performing of the auto focusing comprises using coordinate values and pressure values of the two touched points to set the focusing area.

4. The control method of claim 3, wherein the coordinate value of the focusing area is calculated by a formula, $$(X_f, Y_f) = \left(\frac{P_1 X_1 + P_2 X_2}{P_1 + P_2}, \frac{P_1 Y_1 + P_2 Y_2}{P_1 + P_2}\right)$$

where $(X_f, Y_f)$ is a coordinate value of a focus, $X_1$ and $Y_1$ are X and Y coordinate values of a first touch point, $X_2$ and $Y_2$ are X and Y coordinate values of a second touch point, $P_1$ is a pressure value of the first touch point, and $P_2$ is a pressure value of the second touch point.

5. The control method of claim 1, wherein the photographing command comprises a touch input that has a pressure value equal to or greater than a predetermined pressure value with respect to the two touched points.

6. The control method of claim 1, further comprising:
   when a distance between the two touched points is increased, performing a zoom-in operation, and when the distance between the two touched points is decreased, performing a zoom-out operation.

7. A digital photographing apparatus, comprising:
   a photographing unit;
   a touch screen to display an image being input through the photographing unit; and
   a control unit to, when touch inputs with respect to two touched points on the touch screen are recognized, automatically set a focusing area which is located between the two touched points in response to the two touched points, perform auto focusing based on the focusing area, and when a photographing command is input, control the photographing unit to capture an image on which the auto focusing is performed.

8. The digital photographing apparatus of claim 7, wherein the control unit sets a center point between the two touched points as the focusing area and performs the auto focusing.

9. The digital photographing apparatus of claim 7, wherein the control unit detects pressure values of the two touched points, and sets the focusing area by using the coordinate values and pressure values of the two touched points.

10. The digital photographing apparatus of claim 9, wherein a coordinate value of the focusing area is calculated by a formula, $$(X_f, Y_f) = \left(\frac{P_1 X_1 + P_2 X_2}{P_1 + P_2}, \frac{P_1 Y_1 + P_2 Y_2}{P_1 + P_2}\right)$$

where $(X_f, Y_f)$ is a coordinate value of a focus, $X_1$ and $Y_1$ are X and Y coordinate values of a first touch point, $X_2$ and $Y_2$ are X and Y coordinate values of a second touch point, $P_1$ is a pressure value of the first touch point, and $P_2$ is a pressure value of the second touch point.

11. The digital photographing apparatus of claim 7, wherein the photographing command comprises a touch input that has a pressure value equal to or greater than a predetermined pressure value with respect to the two touched points.

12. The digital photographing apparatus of claim 7, wherein when a distance between the two touched points is increased, the control unit performs a zoom-in operation, and when the distance between the two touched points is decreased, the control unit performs a zoom-out operation.

13. A control method of a digital photographing apparatus, comprising:
displaying an image being input through a photographing unit on a touch screen;
recognizing a touch input with respect to one point on the touch screen;
setting a focusing area which is located between the touched point and a predetermined point, and performing auto focusing based on the focusing area; and
when a photographing command is input, capturing an image on which the auto focusing is performed,
wherein the performing of the auto focusing comprises setting a center point between the touched point and the predetermined point as the focusing area to perform the auto focusing.

14. The control method of claim 13, wherein the performing of the auto focusing further comprises when a pressure value of the touched point is increased, moving the focusing area toward the touched point.

15. A digital photographing apparatus, comprising:
a photographing unit;
a touch screen to display an image being input through the photographing unit; and
a control unit which when a touch input with respect to one point on the touch screen is recognized, sets a focusing area which is located between the touched point and a predetermined point, performs auto focusing based on the focusing area, and when a photographing command is input, controls the photographing unit to capture an image on which the auto focusing is performed,
wherein the control unit sets a center point between the touched point and the predetermined point as the focusing area and performs the auto focusing.

16. The digital photographing apparatus of claim 15, wherein when a pressure value of the touched point is increased, the control unit moves the focusing area toward the touched point.

17. A digital photographing apparatus, comprising:
a touch screen to display an image and to sense at least one touch of a user;
a photographing unit to capture the image; and
a control unit to set a focusing area based on the sensed at least one touch of a user and to perform an auto focusing operation at a location corresponding to the focusing area in response to an input photographing command to capture the image,
wherein the focusing area is located between a location of the sensed one touch of the user and another touch of the user, or between a location of the sensed one touch of the user and a predetermined location on the touch screen,
wherein the control unit calculates a location of the focusing area by comparing at least one of a pressure and a location of the sensed at least one touch of the user to another touch of the user.

18. The digital photographing apparatus of claim 17, wherein the control unit calculates a location of the focusing area by comparing at least one of a pressure and a location of the sensed at least one touch of the user to a predetermined location on the touch screen.

19. The digital photographing apparatus of claim 18, wherein the predetermined location on the touch screen is user-defined.

20. The digital photographing apparatus of claim 17, wherein the touch screen displays a focusing frame at the location corresponding to the focusing area.

21. The digital photographing apparatus of claim 17, wherein the focusing area moves closer to a location of the touch of the user as a pressure of the touch increases.

22. The digital photographing apparatus of claim 17, wherein a movement of the touch of the user on the touch screen causes the image to zoom in and/or out.

23. The digital photographing apparatus of claim 17, wherein the image displayed on the touch screen is a live view image input through the photographing unit.

24. The digital photographing apparatus of claim 17, further comprising a storage unit to store a plurality of images therein, wherein the image displayed on the touch screen is one of the plurality of images stored within the storage unit.

* * * * *